Jan. 23, 1940.  M. H. JOHANSON  2,188,005
METHOD OF AND APPARATUS FOR RELIEVING GEAR CUTTERS
Filed May 15, 1937   2 Sheets-Sheet 1
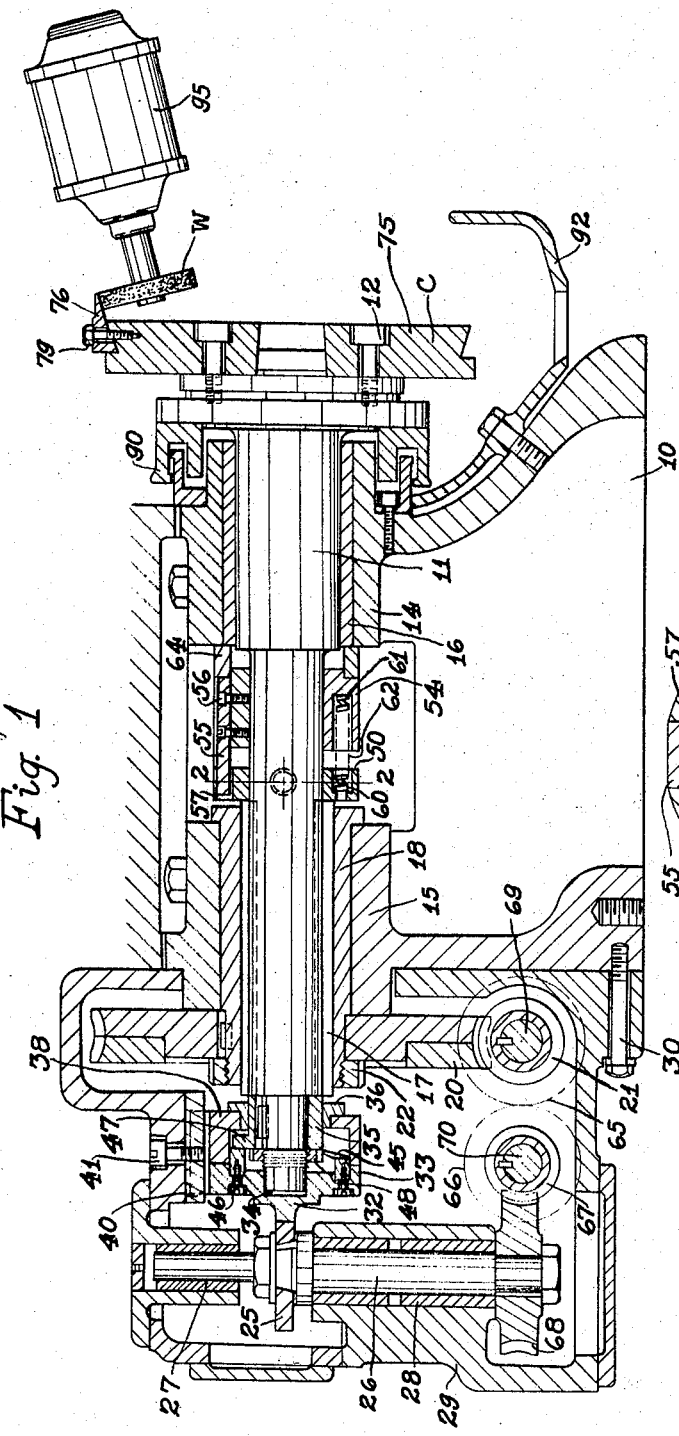
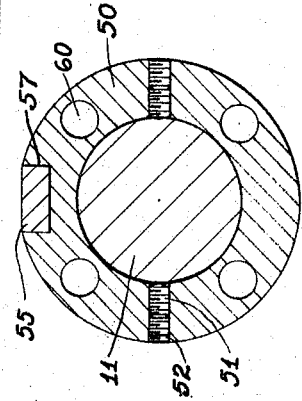
Inventor
Magnus H. Johanson
By
Attorney Jan. 23, 1940.  M. H. JOHANSON  2,188,005
METHOD OF AND APPARATUS FOR RELIEVING GEAR CUTTERS
Filed May 15, 1937  2 Sheets—Sheet 2

Inventor
Magnus H. Johanson
By
B. E. Schlesinger
Attorney

Patented Jan. 23, 1940

2,188,005

UNITED STATES PATENT OFFICE 2,188,005

METHOD OF AND APPARATUS FOR RELIEVING GEAR CUTTERS

Magnus H. Johanson, Rochester, N. Y., assignor to Gleason Works, Rochester, N. Y., a corporation of New York Application May 15, 1937, Serial No. 142,819

8 Claims. (Cl. 51—95)

The present invention relates to the grinding of blades of face-mill gear cutters and particularly to the grinding of blades of face-mill gear cutters of the "single-cycle" type.

A "single cycle" type face-mill gear cutter has blades which are arranged only part-way around its periphery and there is a gap between the last and first blades of the cutter to permit of indexing the gear blank, which is being cut, when this gap is abreast of the blank in the rotation of the cutter. Such cutters may be made in various forms. A preferred construction is that in which all the blades are made of the same height but successive blades are displaced with reference to one another radially of the axis of the cutter so that each blade cuts a chip off of one side of a tooth space of a gear blank and the final blade finishes the side of the tooth space. In a cutter of this type, successive outside cutting blades are progressively displaced radially outwardly and successive inside cutting blades are progressively displaced radially inwardly.

The present invention relates, in particular to the relief-grinding of "single-cycle" cutters of this type and especially to the relief-grinding of segmental cutters of this type and cutters of this type whose blades are integral with the cutter head.

In the present invention, the relief-grinding of the blades is effected by rotating the cutter under a grinding wheel while effecting an axial relieving movement between the cutter and the wheel as each blade is ground and simultaneously progressively advancing or withdrawing the cutter axially so that different blades of the cutter are relieved with the cutter in different axial positions. The blades of these cutters have side surfaces of positive pressure angle, that is, side surfaces which are inclined to the axis of the cutter. Accordingly, when the cutter is displaced axially relative to the grinding wheel between the grinding of different blades, the side surfaces of different blades will be so ground that they are displaced with reference to one another radially of the axis of the cutter. When relieving the preferred type of "single-cycle" cutter, then, the cutter is advanced axially between the grinding of successive outside cutting blades and the cutter is withdrawn axially relative to the grinding wheel between the grinding of successive inside cutting blades, to secure the desired radial displacement of successive corresponding cutting edges.

In the drawings:

Fig. 1 is a vertical sectional view through a relief-grinding machine built according to one embodiment of this invention;

Fig. 2 is a section on the line 2—2 of Fig. 1 but on an enlarged scale;

Figure 3:
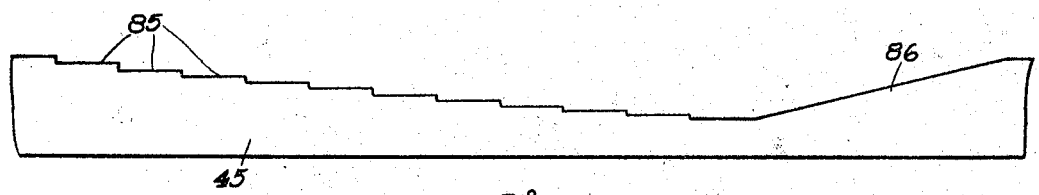
Fig. 3 is a developed view of a cam such as may be employed on the machine shown for imparting the progressive axial displacement to the cutter between the grinding of successive blades of the cutter.

Reference will now be had to the drawings for a more detailed description of the invention. 10 designates the work head or column of the relief-grinding machine and 11, the work spindle or cutter support. The cutter C to be ground is secured to the nose of this spindle by screws 12.

The work head is provided with two spaced bearings 14 and 15 for the spindle 11. The spindle is journaled in the forward bearing 14 by means of the bushing 16. It is keyed by means of keys 17 to a sleeve 18 that is journaled in the rear bearing 15. The spindle is rotated by means of a worm wheel 20 and a worm 21. The worm is driven from any suitable source of power and the worm wheel is keyed to the sleeve 18. It is held against axial displacement relative to the sleeve by a nut 22 which threads onto the sleeve.

The axial relieving movement required to effect the relief-grinding of each blade of the cutter is imparted to the spindle 11 by a cam 25. This cam is keyed to a shaft 26 that extends at right angles to the axis of the spindle 11 and that is journaled on bushings 27 and 28 in a housing or bracket 29. The housing or bracket 29 is secured by screws 30 to the work head or column 10.

The cam 25 engages a follower 32. This follower is integral with a plate 33 that is formed with a pilot recess 34 to receive the reduced rear end of the spindle 11. There is a collar 35 keyed to the reduced end of the spindle 11 and there is a bushing 36 mounted on this collar. The bushing serves as a support for a cup-shaped member 38 that cooperates with the plate 33 to form a housing for the displacement cam and follower hereinafter described. The parts 33 and 38 are held against rotation by a key 40 which engages in aligned slots in these two parts and which is secured to the housing 29 by the screw 41.

Secured to the plate 33, on the side opposite that which is formed with the follower 32, is a face-cam 45. This cam is fastened to the plate 33 by screws 46 and it engages a follower 47 that is formed integral with the collar 35. A nut 48 that threads onto the spindle 11 serves to hold the collar 35 against axial displacement relative to the spindle and to hold the collar against the rear ends of the keys 17.

Mounted on the spindle 11 between the bearings 14 and 15 is a collar 50. This collar is secured to the spindle by screws 51 which are held in position by set-screws 52. There is a sleeve member 54 also mounted on the spindle 11 between the bearings 14 and 15. Secured to this sleeve member by screws 56 is a bar 55. This bar engages in a slot 57 formed in the collar 50 so that as the collar 50 rotates with the spindle 11, the sleeve member 54 is rotated also.

The collar 50 and sleeve member 54 are provided with opposed registering recesses 60 and 61 in which are mounted coil-springs 62. The sleeve member 54 is centered on a bushing or spacer 64. The coil-springs 62 serve to hold the follower 47 against the face-cam 45 and the follower 32 against the peripheral cam 25.

The cam shaft 26 is driven in time with the rotation of the spindle 11 through a pair of spur change gears 65 and 66, a worm 67 and a worm wheel 68. The change gears 65 and 66 are secured to the shafts 69 and 70, respectively, to which the worms 21 and 67, respectively, are keyed. The worm wheel 68 is keyed to the shaft 26. Thus, as the spindle 11 rotates, an axial movement is imparted to the spindle in time with the spindle rotation by operation of the cam 25 and simultaneously an additional axial movement is imparted to the spindle by operation of the cam 45.

Figure 5:
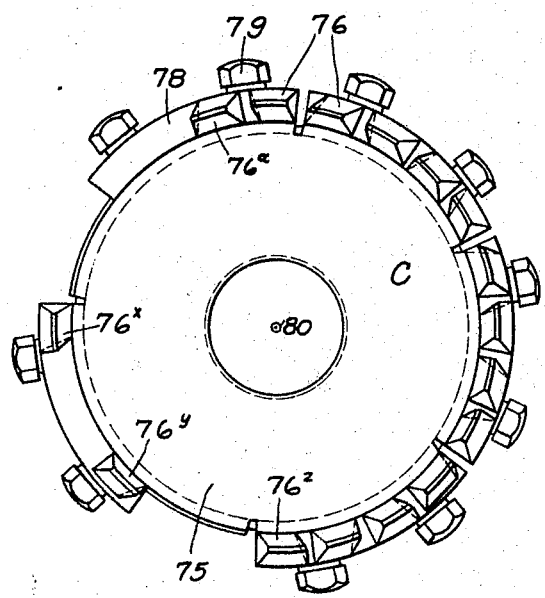
Fig. 5 is an elevational view of a "single-cycle" cutter such as may be relief-ground by the present invention.

The machine is especially designed to relieve face-mill gear cutters of the "single-cycle" type. A cutter of this type is shown in Fig. 5. This cutter comprises a rotary head 75 and a plurality of cutting blades 76 which project beyond one side face of the head 75 in the general direction of the axis of the head and which are arranged part-way only around the periphery of the head. The cutter shown is of the segmental type such as is illustrated in the patent to James E. Gleason, No. 2,129,056 patented September 6, 1938. The cutting blades of this cutter are integral with segments 78 which are secured to the head by screws 79.

In the embodiment shown, alternate blades have opposite side-cutting edges, that is, one blade is an inside cutting blade and the next blade is an outside cutting blade. The blades of the cutter are, as stated, arranged only part-way around the periphery of the head and there is a gap between the last blade 76$^x$ and the first blade 76$^a$ which is of sufficient extent to permit a gear blank, that is being cut, to be indexed while this gap is abreast of the blank in the rotation of the cutter. The blades of the cutter are so made that successive outside cutting blades around the cutter have their cutting edges disposed at successively increasing distances from the axis 80 of the cutter and successive inside cutting blades have their cutting edges disposed at successively decreasing distances from the axis of the cutter. Thus, as the cutter rotates in engagement with a previously roughed gear blank, the successive outside cutting edges will cut more and more stock off of the concave side of a tooth space, widening out the same to produce the final tooth shape and successive inside cutting blades will cut more and more stock off of the convex side of the tooth space, widening out the same to produce the final tooth shape. The last blades 76$^y$ and 76$^x$ of the cutter are final inside and outside finishing blades, respectively and are spaced from one another a distance greater than the face-width of the gear blank being cut. Likewise, the blade 76$^y$ is spaced from the preceding blade 76$^z$ a distance greater than the face width of the gear blank being cut. Hence, only one of the finishing blades will be in the cut at one time. All this is of standard construction and is fully described in the Gleason application above mentioned.

From the above description, it will be seen that it is necessary to relief-grind the blades of a cutter such as shown in Fig. 5 so that the outside cutting edges of successive outside cutting blades will be disposed at progressively increasing radial distances from the axis of the cutter and the inside surfaces of successive inside cutting blades will be disposed at progressively decreasing radial distances from the axis of the cutter. All of this may be accomplished very readily on a machine built according to the present invention.

For relieving the inside blades of the cutter shown, a cam 45 may be used such as shown in development in Fig. 3. This cam is formed with successive steps 85, of which one is provided for each inside cutting blade and these steps are so formed that as the spindle 11 rotates on its axis, the spindle moves axially rearwardly under actuation of the springs 62 through operation of the cam 45. The cam is provided with a rise 86 after the final step 85 to return the spindle forwardly by the distance that it has moved rearwardly in the successive steps.

The cam 25 may be of Archimedean spiral form to produce the required relieving motion as each inside or as each outside blade of the cutter passes under the grinding wheel W.

For grinding the inside surfaces of the blades of the cutter, a cylindrical grinding wheel W may be used. This wheel, which in the embodiment shown is driven by a motor 95, is adjusted into engagement with a blade of the cutter so that its axis is inclined to the axis of the spindle 11 at an angle equal to the pressure angle of the inside blades. A separate wheel may be used for grinding the outside blades or the wheel W may be readjusted for the purpose. The tops of the blades may be ground according to the conventional method.

Figure 4:
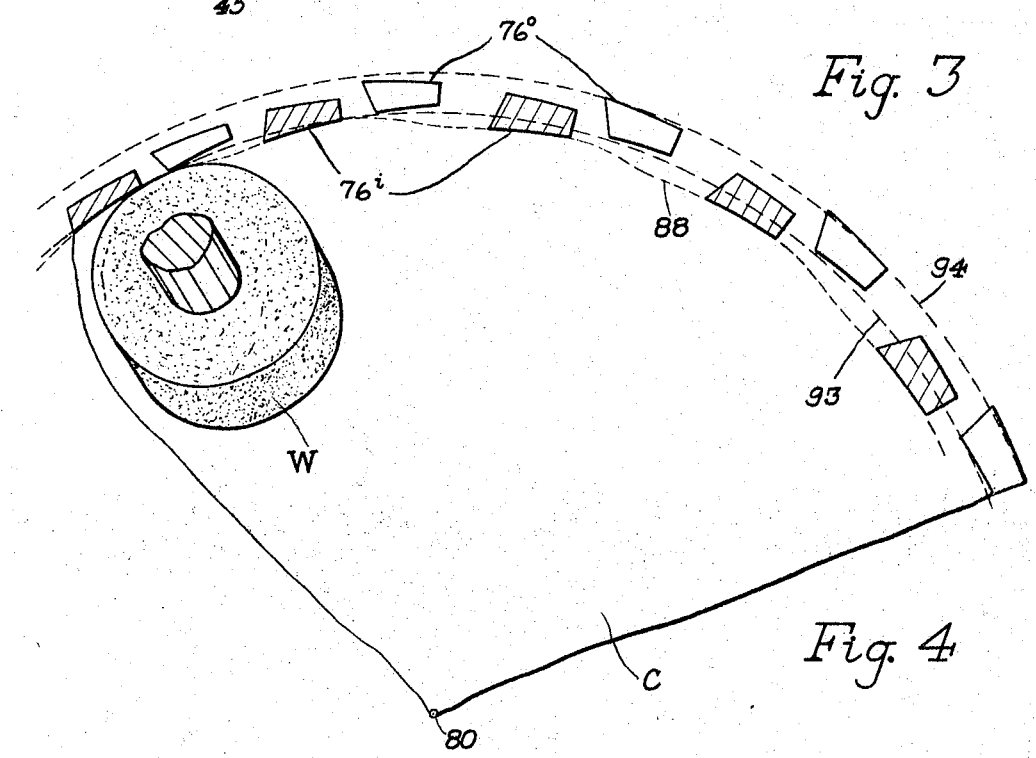
Fig. 4 is a diagrammatic view illustrating the principle of operation of the present invention.

The operation of grinding the inside cutting blades of the cutter C is illustrated diagrammatically in Fig. 4. The grinding wheel W is adjusted so that its axis is inclined to the axis 80 of the cutter head at an angle corresponding to the pressure angle of the inside blades to be ground. The machine is then put in operation and the cutter spindle 11 and the cam shaft 26 rotate on their axes in timed relation. As each inside blade 76$^i$ of the cutter rotates under the grinding wheel W, the cam 25 imparts an axial forward movement to the spindle 11 with the result that the inside surface of the blade is relieved from front to rear along an Archimedean spiral to provide the required cutting clearance back of the inside cutting edges of the blades. As the spindle rotates, also, it is moved rearwardly step-by-step through operation of the coil-springs 62 and the cam 45 so that the relieving operation on successive inside blades 76$^i$ takes place with the cutter in different axial positions. The result is that successive inside cutting blades are ground to have their inside surfaces at decreasing radial distances from the axis 80 of the cutter head and the inside cutting edges of successive inside cutting blades are therefore, as desired, displaced radially inwardly with respect to one another. The path followed by the grinding wheel in the grinding of the inside surfaces of the inside cutting blades is indicated by the dotted line 88. As each blade passes under the grinding wheel, the cam 25 operates to grind the blade inside surface along an Archimedean spiral, and as successive inside blades rotate into position, the cam 45 operates to shift the cutter axially rearwardly and grind side surfaces on the successive inside blades which are displaced from one another readily inwardly.

To grind the outside surfaces of the outside cutting blades of the cutter, the cam 45 is removed and is replaced by another cam having steps similar to the steps 85 but displaced from one another forwardly of the axis of the spindle 11 instead of rearwardly thereof. With such a cam for relieving the outside blades, the outside surfaces of successive outside cutting blades will be ground so that the outside cutting edges of these blades will lie at successively increasing radial distances from the axis 80 of the cutter, as desired. The cam 25, as before, will produce the necessary relief on each blade.

The dotted lines 93 and 94 are drawn concentric to the axis 80 of the cutter and indicate how the cutting edges of successive blades of the cutter are offset radially relative to one another.

A labyrinth guard 90 may be provided for the cutter spindle 11 to prevent entry of dirt or grit into the spindle bearings and a suitable shaped trough 92 may be secured to the work head 10 to catch the grit and water during the grinding operation. The machine will be otherwise equipped, also, as are standard relief-grinders.

Instead of using a stepped cam such as shown in Fig. 3, a cam might be used having a continuous rise or drop for that part of its path which is to control the relieving of the roughing blades of the cutter. Furthermore, the steps used for moving the cutter axially for relieving of the final finish-blades may be oblique to the axis of the cutter instead of at right angles thereto. Where oblique steps and a continuous rise or drop are employed the shape of the cam path is a resultant not only of the axial motion desired between grinding of different blades but of the axial motion that takes place during the relieving of each blade.

While the invention has been described in connection with a machine in which both the relieving motion for the individual blades and the progressive displacement for successive blades are imparted to the blade-support, it will be understood that one or both of these motions might be imparted instead to the grinding wheel. In general, it may be said that while the invention has been described in connection with a particular embodiment thereof and in connection with a particular use therefor, it will be understood that it is capable of still further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of relieving the side surfaces of blades of a face-mill gear cutter which comprises mounting the blades in a rotary head so that they are arranged circularly about the axis of the head and the side surfaces to be relieved are inclined to the axis of the head, mounting a grinding wheel in operative relation with the side surfaces to be relieved and effecting a relative movement between the cutter and wheel axially of the head as the side surface of each blade to be ground passes over the wheel and producing a relative displacement between wheel and head axially of the head between the grinding of the side surfaces of different blades so that the side surfaces of different blades are ground with the head in relatively different axial positions.

2. Apparatus for relieving blades of face-mill gear cutters comprising a rotatable head on which the blades are mounted so that they project beyond one side face of the head in the general direction of the axis of the head and are arranged circularly about the axis of the head, a grinding wheel, means for rotating the grinding wheel, means for rotating the head, means for producing a relative reciprocatory movement between the head and the grinding wheel axially of the head for each blade to be relieved, and means for producing an additional movement of displacement between the head and wheel axially of the head between grinding of different blades so that different blades are relieved in relatively different axial positions of the head.

3. Apparatus for relieving blades of a face-mill gear cutter comprising a rotatable head on which the blades are mounted so that they project beyond one side face of the head in the general direction of the axis of the head and are arranged circularly about the axis of the head, a grinding wheel, means for rotating the grinding wheel, means for rotating the head, means for effecting a relative reciprocatory movement between the head and grinding wheel a plurality of times during a revolution of the head, and means for producing an added relative movement between the head and the grinding wheel axially of the head in one direction during rotation of the head.

4. Apparatus for relieving blades of a face-mill gear cutter comprising a rotatable blade support, a tool support, a grinding wheel journaled in the tool support, means for rotating the grinding wheel, means for rotating the blade support, a rotary cam for reciprocating the blade support, means for driving the cam in time with the rotation of the blade support to effect relieving of a blade of the cutter as the blade passes over the grinding wheel, a cam mounted coaxially of said blade support and a follower carried by said blade support engaging said cam to effect progressive displacement of the blade support axially between grinding of different blades of the cutter.

5. Apparatus for relieving blades of a face-mill gear cutter comprising a rotatable blade support, a tool support, a grinding wheel journaled in the tool support, means for rotating the grinding wheel, a cam mounted to rotate about an axis at right angles to the blade support, a follower engaging said cam, a second cam mounted on said follower coaxially of the blade support, a follower carried by the blade support engaging said second cam, means for rotating the blade support, and means for rotating the first cam in timed relation with the rotation of the blade support.

6. In a machine for relief-grinding blades of a face-mill gear cutter, a rotatable head adapted to have a plurality of blades secured thereto with the blades projecting beyond one side face of the head in the general direction of the axis of the head and arranged in a group that extends circularly part-way only around the periphery of the head, a grinding wheel, means for rotating the grinding wheel, means for rotating the head, means for effecting a relative reciprocating movement between the wheel and head a plurality of times during rotation of the group of blades past the grinding wheel, and means for producing an added movement between the wheel and head axially of the head in one direction while the group of blades pass the wheel.

7. In a machine for relief grinding blades of a face-mill gear cutter, a rotatable work support and a tool support, one of which is mounted for reciprocating movement axially of the work support, a grinding wheel journaled in the tool support, means for rotating the grinding wheel, means for rotating the work support, a pair of rotary cams, means operatively connecting one of said cams to the reciprocable support so that rotation thereof displaces said support axially of the work support, means operatively connecting the other cam to the first cam so that rotation of the second cam imparts reciprocatory movement to the first cam and to the reciprocatory support, means for rotating one of said cams once for each revolution of the work support, and means for rotating the other cam once for each blade to be relieved.

8. In a machine for relief-grinding blades of a face-mill gear cutter, a rotating grinding wheel, a rotatable work support, a cam and a cooperating follower, one of which is secured to the work support to rotate therewith and the other of which is slidable axially of the work support, a follower secured to the slidable part, a second cam operatively connected to said second follower, means for rotating the grinding wheel, means for rotating the work support and means for rotating the second cam in time with the rotation of the work support.

MAGNUS H. JOHANSON.